(12) United States Patent
Richardson (10) Patent No.: US 10,679,154 B2
(45) Date of Patent: Jun. 9, 2020

(54) INFRASTRUCTURE POSITIONING

(71) Applicant: Network Mapping UK Limited, Knaresborough, North Yorkshire (GB)

(72) Inventor: Paul Richardson, Knaresborough (GB)

(73) Assignee: Network Mapping UK Limited, Knaresborough, North (GB)

( * ) Notice: Subject to any disclaimer, the term of this patent is extended or adjusted under 35 U.S.C. 154(b) by 529 days.

(21) Appl. No.: 15/103,166

(22) PCT Filed: Dec. 3, 2014

(86) PCT No.: PCT/GB2014/053592
§ 371 (c)(1),
(2) Date: Jun. 9, 2016

(87) PCT Pub. No.: WO2015/087050
PCT Pub. Date: Jun. 18, 2015

(65) Prior Publication Data
US 2016/0314415 A1    Oct. 27, 2016

(30) Foreign Application Priority Data

Dec. 10, 2013    (GB) .................................. 1321847.4

(51) Int. Cl.
*G06Q 10/04*    (2012.01)
*G06Q 10/06*    (2012.01)
(Continued)

(52) U.S. Cl.
CPC ............ *G06Q 10/047* (2013.01); *G01S 17/06* (2013.01); *G01S 17/89* (2013.01); *G01S 19/48* (2013.01);
(Continued)

(58) Field of Classification Search
CPC ............... G06Q 10/047; G06Q 10/063; G06Q 10/0631; G01S 17/06; G01S 17/89; G01S 19/48; G06F 17/509; G06F 2217/36
See application file for complete search history.

(56) References Cited

U.S. PATENT DOCUMENTS 6,643,400 B1 * 11/2003 Murakawa ........... G06K 9/4609
358/403
2008/0215414 A1 * 9/2008 Fehnel .............. G06F 17/30241
705/7.16
(Continued)

FOREIGN PATENT DOCUMENTS

CN    101335431 A    12/2008
CN    102635059 B    2/2014
(Continued)

OTHER PUBLICATIONS

International Search Report and Written Opinion in corresponding PCT Appln. No. PCT/GB2013/051668, dated Jun. 25, 2013.
(Continued)

*Primary Examiner* — Pinalben Patel
(74) *Attorney, Agent, or Firm* — Kilpatrick Townsend & Stockton LLP (57) ABSTRACT

A computer implemented method determines a route for an infrastructure element by analysing the satellite and lidar information. A method determines a route for an infrastructure element from satellite and liDAR information. Satellite information is analysed and a route corridor between a first location and a second location is determined from the satellite information. LiDAR information is analysed and a route between the first location and the second location is determined from the liDAR information.

12 Claims, 8 Drawing Sheets

(51) Int. Cl.
*G06F 30/18* (2020.01)
*G01S 17/06* (2006.01)
*G01S 17/89* (2020.01)
*G01S 19/48* (2010.01)
*G06F 13/16* (2006.01)
*G06F 113/16* (2020.01)

(52) U.S. Cl.
CPC ........... *G06F 30/18* (2020.01); *G06Q 10/063* (2013.01); *G06Q 10/0631* (2013.01); *G06F 2113/16* (2020.01)

(56) References Cited

U.S. PATENT DOCUMENTS

2009/0043504 A1* 2/2009 Bandyopadhyay .... G01C 17/38 701/469
2018/0357909 A1* 12/2018 Eyhorn ................ G08G 5/0034

FOREIGN PATENT DOCUMENTS

KR  100732915 B1  6/2007
SU    886124 A1  11/1981

OTHER PUBLICATIONS

Examination Report in corresponding GB Appln. No. 1211342.9, dated Oct. 22, 2012.
Hassabo et al., "Semi-Automatic Optimal Route Location Using High Resolution Satellite Images, GIS, Linear Programming and Active Contours Optimization Techniques", 19th International Conference on Geoinformative, Jun. 2011.
Ye Yu et al., "A Cute Line Based Method for Building Modeling From LiDAR and Satellite Imagery", Second International Conference on Computing, Communication and Networking Technologies, 2010.
Examination Report for Application No. GB1321847.4, dated Dec. 2, 2019, 4 pages.

* cited by examiner

INFRASTRUCTURE POSITIONING

CROSS-REFERENCE TO RELATED APPLICATIONS

This application is the U.S. national stage application of International Application PCT/GB2014/053592, filed Dec. 3, 2014, which international application was published on Jun. 18, 2015, as International Publication WO2015/087050 in the English language. The international application is incorporated herein by reference, in entirety. The international application claims priority to GB Patent Application No. 1321847.4, filed Dec. 10, 2013, which is incorporated herein by reference, in entirety.

This disclosure relates to infrastructure positioning. In particular, but without limitation, this disclosure relates to the determination of a position for an infrastructure element—such as an electrical transmission line.

The planning and building of new infrastructure such as transmission lines, roads, and railways involves the consumption of a significant amount of resources that include not only the physical resources that will become the infrastructure elements once the infrastructure is realised, but also resources that will be used to plan the siting and configuration of the infrastructure. In particular, it is seldom acceptable, or even possible, for an infrastructure element that is to link two locations to be built 'Roman road' fashion in the form of a straight line between the two locations and instead, a number of factors need to be taken into account when determining how an infrastructure element is to be positioned. The particular factors that need to be taken into account may depend upon the locations that are to be linked, but can include: terrain factors, such as the locations of hills, valleys, rivers, and lakes; infrastructure factors, such as the locations of roads, railway lines, and canals; and societal factors, such as proximity to densely populated areas. The determination and evaluation of such factors in order to plan the siting and configuration of infrastructure elements can involve the consumption of significant amounts of physical resources.

Aspects and features of the present disclosure are set out in the appended claims.

An approach for determining a route for positioning of infrastructure elements such as an electricity transmission line involves taking satellite imaging data from a region that includes a first and second location, processing the satellite data to identify parameters for a number of sub-regions of the region, determining a route corridor between the first and second locations using the determined parameters, taking liDAR data of the determined route corridor and analysing the liDAR data to determine one or more liDAR parameters for sub-regions of the determined route corridor and determining a route between the first location and the second location using the liDAR parameters.

Coarse resolution satellite imaging requires less energy to acquire and process than higher resolution satellite imagery and so the described approach which only employs higher resolution imagery where required avoids unnecessary energy expenditure. Furthermore, determining a narrow route corridor suitable for infrastructure siting before commencing liDAR scanning avoids unnecessarily wasting helicopter fuel by scanning a greater area than is required. The approach described herein enables an optimum route to be determined in terms of the amount of resource needed to construct the infrastructure thereby reducing the amount of resource required to construct the infrastructure. Initial estimates indicate that a combination of macro-analysis, micro-analysis, and liDAR analysis can result in a total 10% reduction in resource required to construct an infrastructure element.

Examples of the present disclosure will now be described with reference to the accompanying drawings in which.

Figure 1:
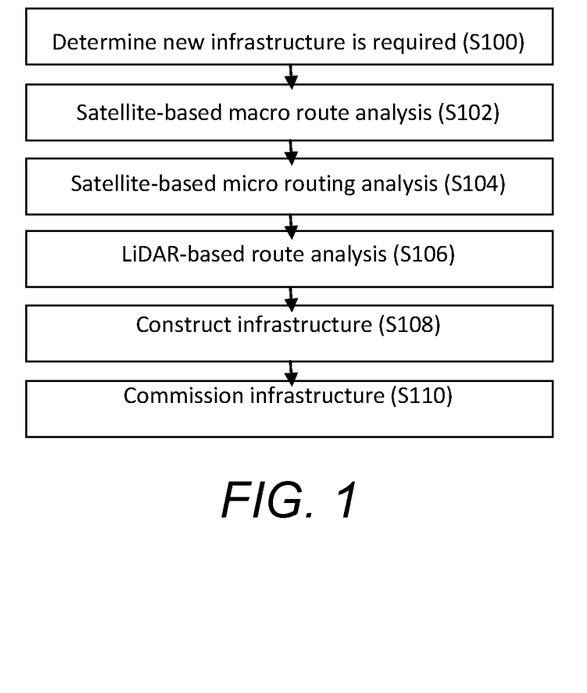
FIG. 1 shows a flow diagram of an approach described herein.

An illustration of a method of determining a route for a transmission line is shown in FIG. 1. At step S100 it is determined that a new infrastructure is required. Subsequently, a satellite-based macro route analysis is performed in order to determine a coarse resolution route (a route corridor) for the positioning of the assets of the new infrastructure at step S102. As one possibility, the satellite-based analysis may be performed on publically or commercially available datasets, which may be augmented by adding further information (such as shape files), for example from an inspection of a recent imagery source. At step S104, a satellite-based micro routing analysis is performed at a finer resolution than that of the macro route analysis in order to identify a finer resolution route corridor for the positioning of the assets of the new infrastructure. Subsequent to the micro route analysis, at step S106, a liDAR-based route analysis is performed at a yet finer resolution than that of the macro analysis in order to determine a final positioning for the assets of the new infrastructure. Following the final determination of the position, the infrastructure is constructed at step S108 and commissioned at step S110. As an example, the macro route analysis could be performed over a 100×50 Km area (5000 square Km), before the micro routing analysis is performed over a much smaller area—for example 100×2-3 KM (200-300 square km).

Figure 2:
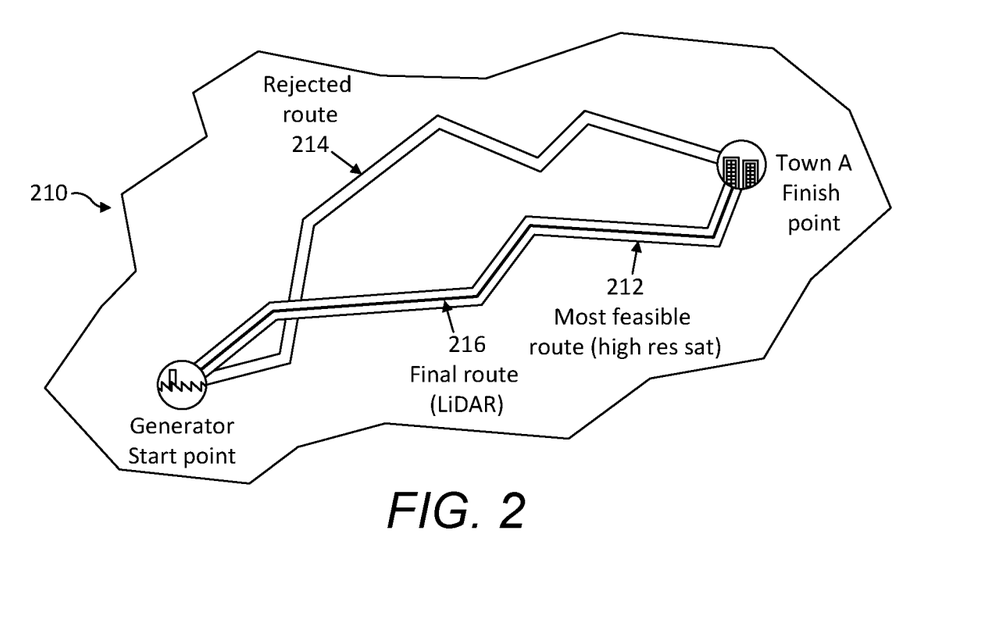
FIG. 2 shows a pictorial representation of the hierarchical route determination approach described herein.

FIG. 2 shows a pictorial representation of the hierarchical route determination approach described herein. In particular, satellite imagery of a potential routing area 210 obtained at a first (coarse) resolution and a number of potential (macro) route corridors between a first location (in this case a generator) and a second location (in this case a town) is evaluated so as to identify a most feasible route corridor 212. FIG. 2 also illustrates a rejected route corridor 214 that was considered and evaluated but was found to be inferior to the most feasible route corridor 212. Due to the coarse resolution of the satellite imagery that is used to identify the most feasible route corridor 212, the identified route corridor does not correspond to a final position for the infrastructure but instead represents a region within which it is most feasible to place the new infrastructure. Satellite imagery of the determined most feasible route corridor 212 is then obtained at a higher resolution than the original coarse satellite imagery and an analysis of the higher resolution satellite imagery is used to determine a final route corridor for the infrastructure to be positioned within. As with the analysis of the coarse satellite imagery, the analysis of the higher resolution satellite imagery will also result in the determination of a region within which it is most feasible to place the new infrastructure (a micro route corridor); however the region will be smaller than that determined by the analysis of the coarse satellite imagery. A liDAR scan of the micro route corridor is then obtained by flying over that route corridor, for example by helicopter, and liDAR scanning a swathe of the overflown terrain that includes the determined micro route corridor. An analysis of the obtained liDAR imaging data is then performed in order to determine a final positioning for the assets of the new infrastructure.

Figure 3:
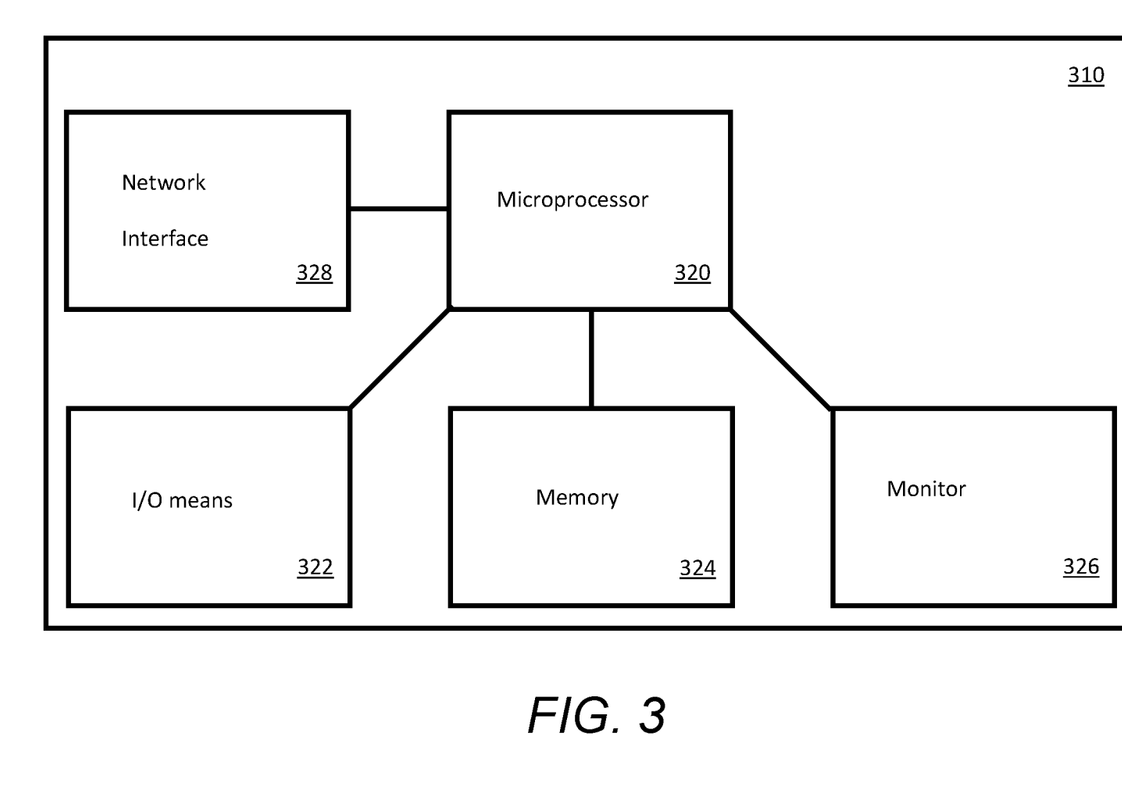
FIG. 3 show a block diagram of an apparatus for implementing elements of the approach described herein.

FIG. 3 shows a block diagram of an apparatus for implementing elements of the approach described herein. A computer 310 comprises a microprocessor 320 arranged to execute computer readable instructions as may be provided to the computer 310 via input/output means 322 which may be arranged, without limitation, to interface with: floppy disks, compact discs, USB sticks, one or more keyboards, and/or one or more computer mice. The microprocessor 320 may also store instructions in a memory 324, for example a random access memory. The microprocessor 320 is arranged to output results of executed programmes at the input/output means 322, via a monitor 326 and/or may communicate those results to another device via a network interface 328 that is arranged to couple the computer 310 to a communications network such as the internet (not shown in FIG. 3). The microprocessor 320 may be further arranged to receive instructions and/or data via the network interface 328.

Figure 4:
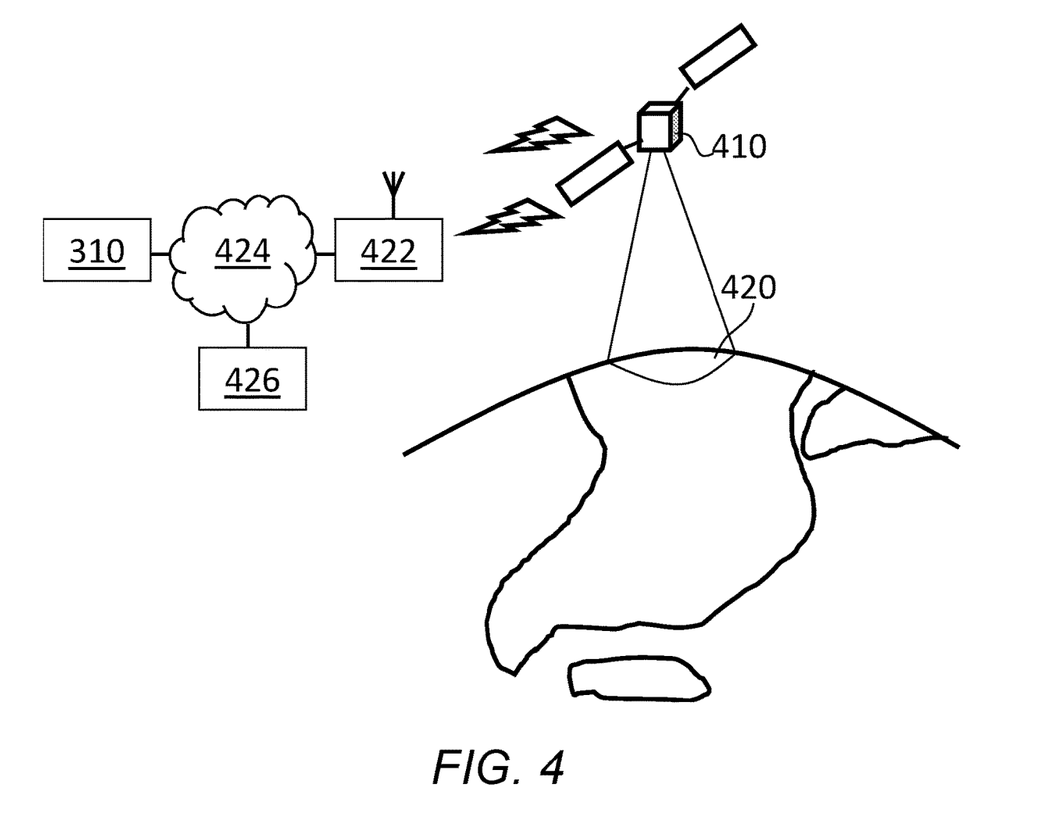
FIG. 4 shows a pictorial representation of the satellite imaging element of the approach described herein.

FIG. 4 shows a pictorial representation of a satellite imaging element of the approach described herein. A satellite 410 images a portion of the Earth 420 to transmit the results of its imaging to a satellite receiver 422. The satellite receiver 422 conveys this information to the computer 310—in this case by way of an applications network 424. FIG. 4 also shows a representation of a liDAR data communicator 426 that is connected to the communications network 424 so as to be able to convey liDAR imaging data to the computer 310.

Figure 5:
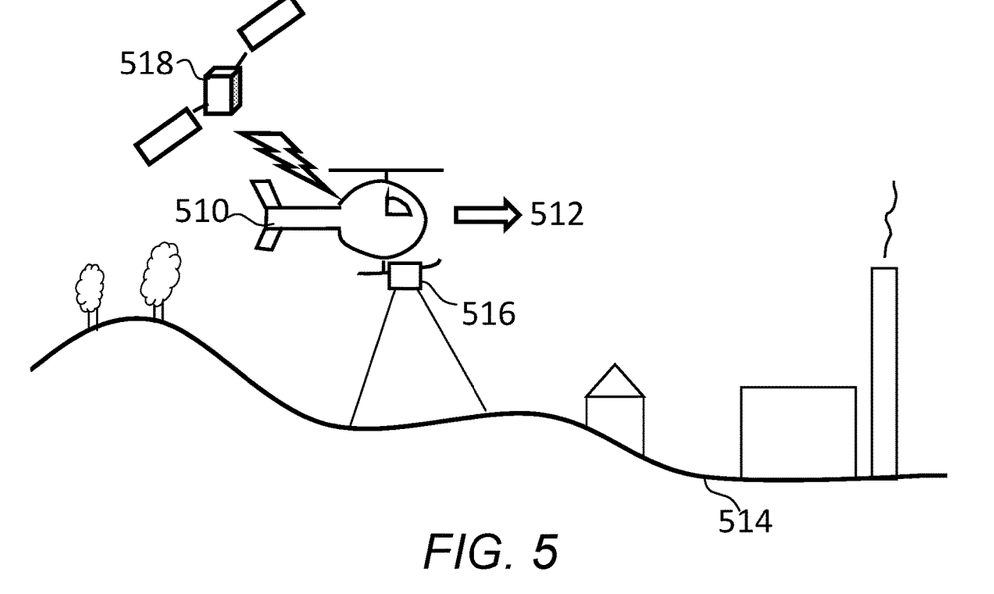
FIG. 5 shows a pictorial representation of the LiDAR imaging element of the approach described herein.

FIG. 5 shows a pictorial representation of a liDAR imaging element of the approach described herein. In FIG. 5 a helicopter 510 flies in direction 512 across a terrain 514 that has been identified by the computer 310 as a consequence of analysing the satellite imaging data that was received from the satellite 410. Whilst flying across the terrain 514, the helicopter 510 (which carries liDAR imaging apparatus 516) performs a liDAR scan of the terrain 514 which it spatially referenced using GPS information that it receives from a GPS satellite 518.

Further details of the route determination approach are described in the following sections.

Macro Satellite-Based Route Determination

Once the computer 310 has been provided with information from which the start and end locations of the infrastructure element can be determined (respectively, first and second locations), the computer receives satellite imaging data that is at a first, coarse, resolution which has been acquired by the satellite 410 and which covers both the start and end locations.

The imaged region is then divided up into a number of sub-regions. In order to facilitate calculations and to avoid lacunae, the region is preferably divided by placing a grid over the region the grid being formed of congruent regular polygons, for example: triangles, squares, or hexagons. Hexagons, having six edges when compared to four edges for squares and three edges for triangles have been found to provide good number of options for determining the route without incurring the problem on the non-contiguous nature should higher order polygons be employed. Once the region has been divided into sub-regions, for each sub-region the satellite information is analysed in order to determine one or more satellite imaging parameters for that sub-region. Examples of details that may be determined from the satellite imaging information—and thus used to form the satellite imaging parameters—include: terrain, such as the presence of a hill or body of water; the presence of a road, railway line or waterway; the presence or absence of buildings; and the presence or absence of dense vegetation. As one possibility, the terrain data described herein may be publically or commercially available and/or may be derived from specifically tasked satellite missions. The determination of parameters from the satellite imaging information may be performed by way of semi-automated (or semi-automated) image analysis and a person skilled in the art will be acquainted with image analysis techniques. Once a feature has been determined from the satellite imaging information, a parameter is assigned based on the result of the analysis and a person skilled in the art will understand that parameters as described herein may be weighted for evaluation purposes using either pre-determined or on-the-fly determined weights.

Example parameters may be labelled (SVETIG) which stand for Societal, Vegetation, Environmental, Terrain, Infrastructure and Geotechnical may vary from country to country, utility to utility or even project to project. Each of these parameters is associated with a weighting (and sub-parameters associated with sub-weightings) which can be defined for each specific project.

Further it is possible to vary these weightings infinitely to derive an infinite number of potential routings, each assigning the relative importance of the weightings and sub-weightings differently.

A very simple example may be that a set of weightings may be determined for the SVETIG parameters, or example to balance the competing importance of the Societal, Vegetation, Environmental, Terrain, Infrastructure and Geotechnical parameters in that geography. To produce a more socially sympathetic routing the Societal, Vegetation and Environmental factors may be raised by 10% and the Terrain, Infrastructure and Geotechnical weightings reduced by 10%. For a more 'cost focussed' routing the corollary would be the case.

Figure 6:
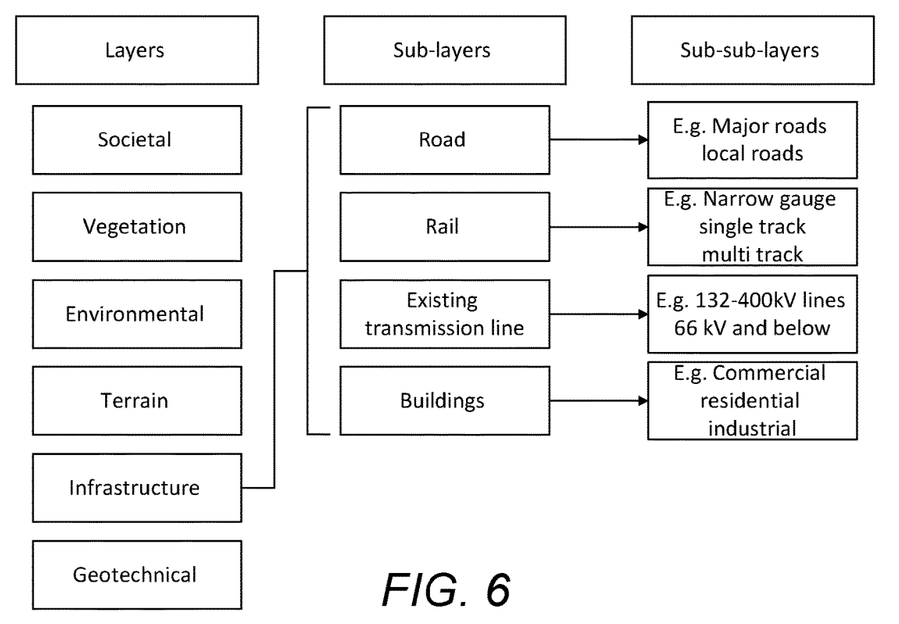
FIG. 6 shows an example of the parameters that may be associated with sub-regions.

Additionally or alternatively, for each sub-region one or more further parameters are determined for that sub-region based upon information other than that provided by the satellite 410. For example, a public utility company may provide information with regard to the location of their assets and, in the event that they have assets within, or in proximity to, the sub-region then a parameter may be associated with that sub-region. As one possibility, information derivable from a map, such as the location of a heritage site or a site of special scientific or aesthetic interest may be used to provide further parameters or sub-regions. Also, social information such as population density may be used to provide parameters for association with a given sub-region. FIG. 6 shows an example of the parameters that may be associated with sub-regions and the infrastructure that is to be decided is an overhead transmission line. The parameters are divided into a number of different layers which may have sub-layers which could themselves have sub-sub-layers. For example, layers of parameters that may be associated with a sub-region include societal parameters, vegetation parameters, environmental parameters, terrain parameters, infrastructure parameters, and geotechnical parameters. In the example of FIG. 6, some sub-layers and sub-sub-layers of the infrastructure layer are shown. The sub-layers including the existence of a road, railway, an existing transmission line, or a building in that sub-region and sub-sub-layers of those respective sub-layers include: the presence or absence of major roads or local roads; the presence or absence of narrow gauge, single track, or multi-track railway lines; the presence or absence of 132 to 400 KV transmission lines or 66 KV low transmission lines; and the presence or absence of commercial, residential, or industrial buildings. Examples of possible layers, sub-layers, and sub-sub-layers that may be employed by the approaches described herein are set out in table 1 below.

TABLE 1

| Layers | Sub-layers | Sub-sub-layers |
| --- | --- | --- |
| Terrain | Slope | |
| | Elevation | |
| Technical/ | Road | Major road |
| Infrastructure | | Local roads |
| | Rail | Narrow gauge |
| | | Single track |
| | | Multi track |
| | Existing Transmission line | 132-400 kV lines |
| | | 66 kV & below |
| | Buildings | Commercial |
| | | Residential |
| | | Industrial |
| Protected Environment | Heritage sites | Conservation areas |
| | | Listed buildings |
| | | Protected wrecks |
| | | Registered battlefields |
| | | Scheduled Monuments |
| | Natural Environment | Area of out beauty |
| | | National Parks |
| | | SSSI |
| | | RAMSAR sites |
| | | Special Protection areas |
| Socio Economic | Population density | |
| | Visual Impact | |
| | Political considerations | |
| | Local Economic Impact | |
| Geotechnical | Felsic | |
| | Mafic | |
| | Sedimentary | |
| Vegetation | Ancient woodlands | |
| | Commercial woodland | |
| | Scrubs and underscrubs | |

As one possibility, for the Geotechnical layer the drift (the superficial layer, e.g. soil, overlaying bedrock) may be assumed to be less than 6 m and the bedrock composition may be used in the analysis; if it is assumed that the drift is greater than 6 m, then the composition of superficial deposits may be used in the analysis.

Figure 7:
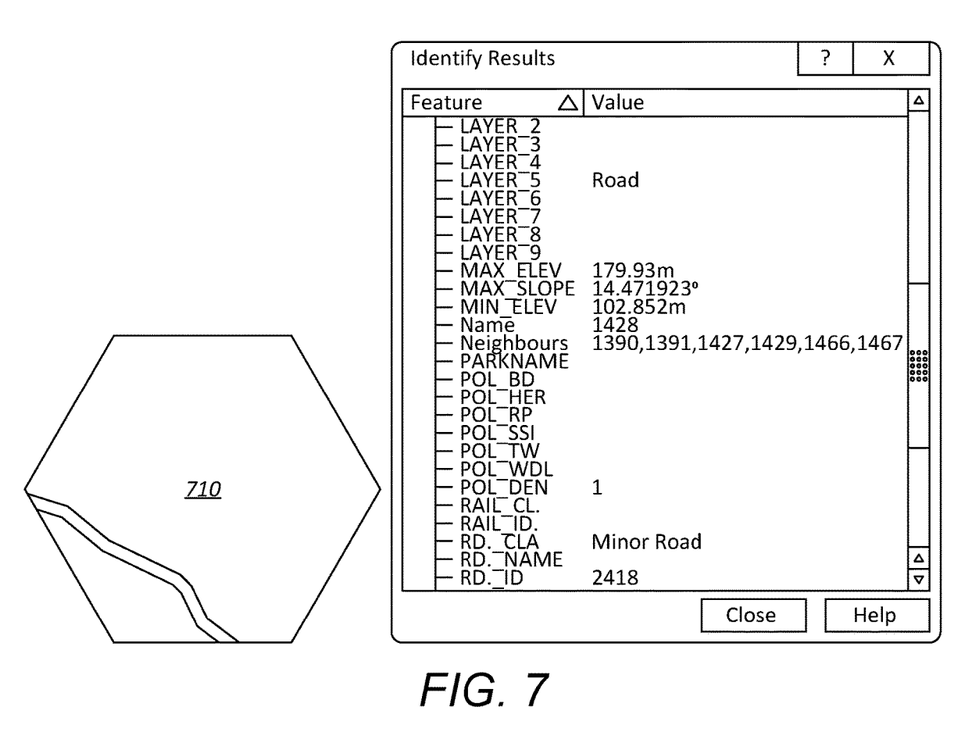
FIG. 7 shows an example sub-region.

FIG. 7 shows an example sub-region 710 that contains a minor road but has no rail, existing transmission line, or building in that hexagon. FIG. 7 further shows a list of the parameters associated with that hexagon. In that case, FIG. 7 indicates that the sub-region 710 contains a road and that the road is classified as a minor road. Further information associated with the sub-region 710 includes: the maximum elevation, maximum slope, minimum elevation, and neighbouring sub-regions.

Figure 8:
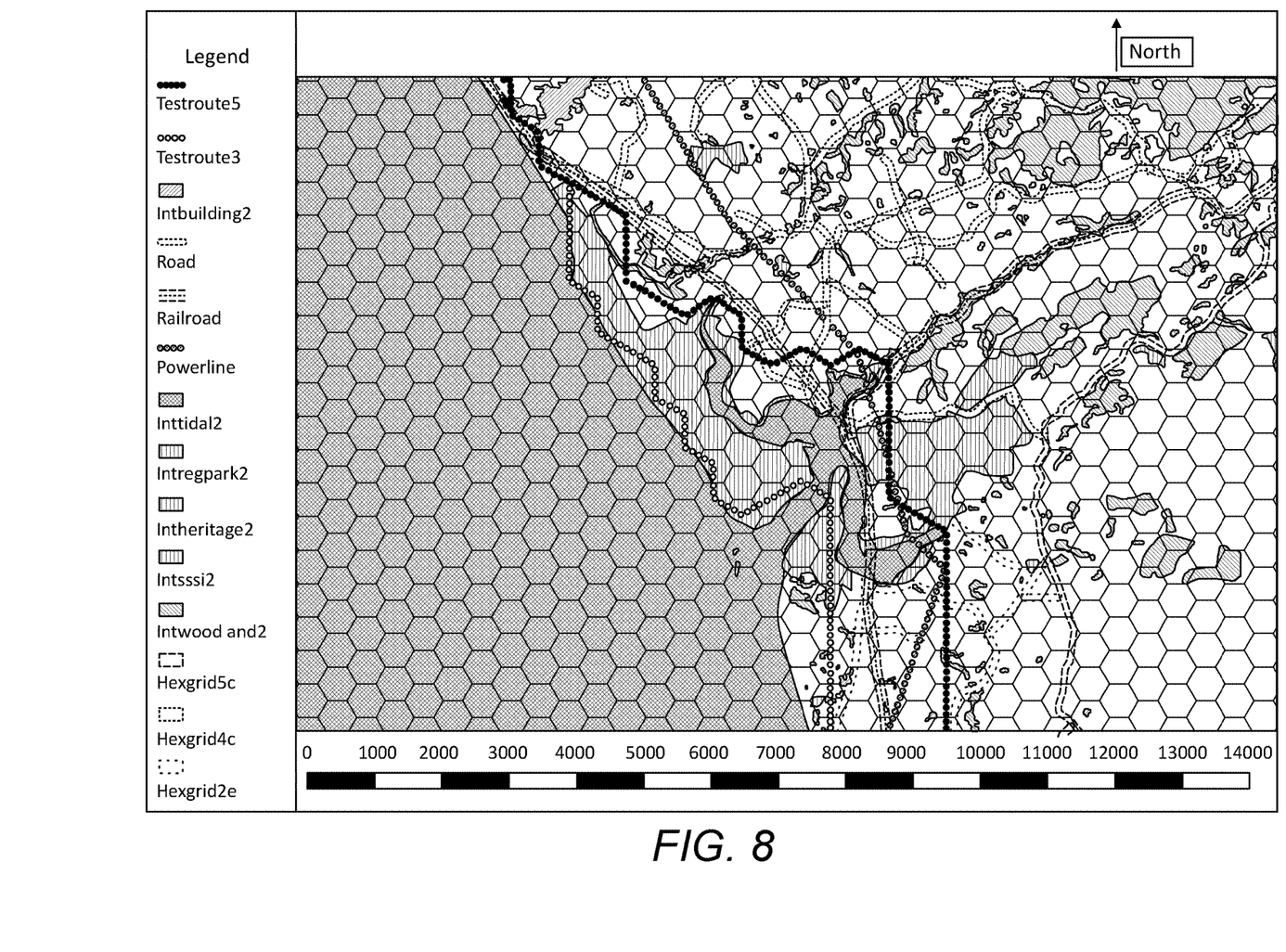
FIG. 8 shows a representation of a region that has been divided into sub-regions and for which the locations of buildings and infrastructure elements have been overlaid.

FIG. 8 shows a representation of a region that has been divided into sub-regions and for which the locations of buildings and infrastructure elements have been overlaid. In particular, the location of bodies of water, woodland, heritage areas, buildings and roads are shown. Also shown are two different potential routes for an infrastructure element that were produced by using different parameter weightings.

Once each sub-region has been assigned one or more parameters, an optimisation approach is employed in order to determine an optimal route between the first and second location. In particular, the parameters associated with each sub-region may be weighted and an optimisation approach that seeks to minimise the sum of the weighted parameters along a path that passes from the first location to the second location via a series of contiguous sub-regions is employed.

As one possibility, an Analytical Hierarchical Process (AHP) to be employed to weight the parameters for each sub-region and an A*algorithm is used to find the lowest total cost between the nodes (sub-regions) based on the weighting of the relevant parameters. Analytical Hierarchical Process is a form of multiple criteria decision making (MCDM). MCDM may be employed to make decisions when determining the optimal route and examples of MCDM methods that may be employed include: PROMETHEE, ELECTRE, AHP, Multi-Attribute Utility Theory (MAUT), and Technique for the Order of Prioritisation Similarity to Ideal Solution (TOPSIS).

The A*algorithm starts at a given node (sub-region) and traverses graph (which is formed by all of the sub-regions of the region under analysis) until it finds a goal node. Whilst doing so, the A*algorithm keeps a record of the best potential path that has to date been discovered. The record of the best potential path is based on the cost to the current node along with the best known path from the start plus an estimate of the cost to travel to the goal node (for example the cost may be based upon the Euclidian distance between the current and goal nodes plus a weight based on the parameters for the current node). As each node is examined, a best cost path is determined and, if the determined best cost is better than that previously calculated, then the current node becomes part of a new best cost path. The process continues until the goal node is reached.

A person skilled in the art will understand that, whilst the above has been described with reference to an A*algorithm, there are many other known mathematical techniques that could be employed in order to determine the optimal route from the first point to the second point and that graph theory optimisation approaches could be adapted for employment herewith.

Once a preferred route (or routes) have been determined by the above macro analysis, a domain (grid of smaller polygons) for the micro analysis is then automatically generated.

Micro Satellite-Based Route Determination

Once the computer 310 has determined an optimal route corridor between the first and second locations at the macro level, then a further stage of refinement may be performed based upon higher resolution satellite imaging data. In particular, instead of having a polygon that may be 2 kilometres across for the macro analysis, the previously determined macro route corridor may be divided into polygons having a smaller size than those of the macro analysis (for example 50 metres across) and the satellite imaging data that is used for the micro analysis may be of a higher spatial resolution than that which is used for the macro analysis. Furthermore, whereas for the macro analysis the route corridor is determined by identifying a route corridor from the first location to the second location via contiguous polygons, for the micro analysis it may not be necessary to identify a route corridor formed of contiguous polygons. In particular, some kinds of infrastructure do not need to continuously be in touch with the ground—for example, overhead electrical transmission lines are generally supported by be spaced apart pylons. Accordingly, the route optimization algorithm (which may otherwise be the same as for the macro analysis) may not need to identify a corridor of contiguous polygons between the first and second locations but instead a series of spaced apart polygons that form a corridor between the first and second locations and correspond to the positions at which support structures, such as pylons, would be located.

Accordingly, when assigning parameters to polygons for a micro analysis, each polygon may have two distinct sets of parameters associated with it—one for if an infrastructure element (such as a pylon) is sited on (or lands on) that polygon, and one for if an infrastructure element oversails (or jumps) that polygon. As there will be different considerations associated with the impact of landing or jumping a polygon (i.e. the respective difficulties of installing a pylon on marshy land and citing overhead cables above playgrounds), the respective landing and jumping parameters for any given polygon will likely differ.

When performing a micro analysis in which jumping and landing are employed, for the purposes of the route optimisation algorithm, each polygon becomes two distinct nodes—one a landing node having the polygon's landing parameters, and the other a jumping node having the polygon's jumping parameters. As a further parameter, the optimisation algorithm may also give weight to nodes based upon the Euclidean distance from the previous landing node. This enables a practical constraint to be applied with regard to the maximum acceptable gap between landing sites.

Figure 9A:
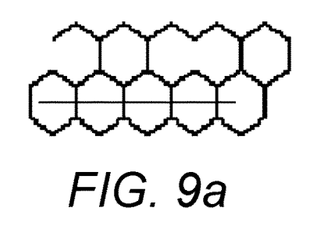
FIGS. 9a and 9b illustrate situations in which respectively rubberbanding is and is not required.
Figure 9B:
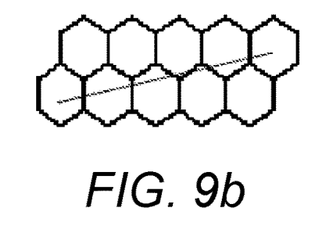

As some utilities, such as overhead power lines cannot change direction at a location other than at a support structure, all over sails may need to be considered as straight lines and, in the event that the route selection algorithm selects a polygon that will result in a change of direction, then the route will no longer follow the centre of the polygons that were previously selected by the algorithm and so, instead of having the situation of FIG. 9A, a line will need to be drawn "rubberbanding" between the landing points (see FIG. 9B) and the determination of the proportion of each polygon that has been over sailed by the proposed spanning may be used to weight the jumping costs for over sailed polygons.

As one possibility, the parameter values for oversailing ('oversailing' parameters) are set to be a constant for a pre-assigned number (n) of polygon. The pre-assigned number being defined in one example by the standard span length. As an example, for a typical 400 kV power line, the standard span is 350 m, so with 50 m wide polygons, 7 (350/7) polygons can be jumped before the parameter values for 'jumping' start to increase. The parameter values will then increase for any number of polygons greater than 'n' (reflecting the need to use larger height towers to span the longer distances) up till a point (n+x) which is defined by the maximum permissible span length.

Figure 10:
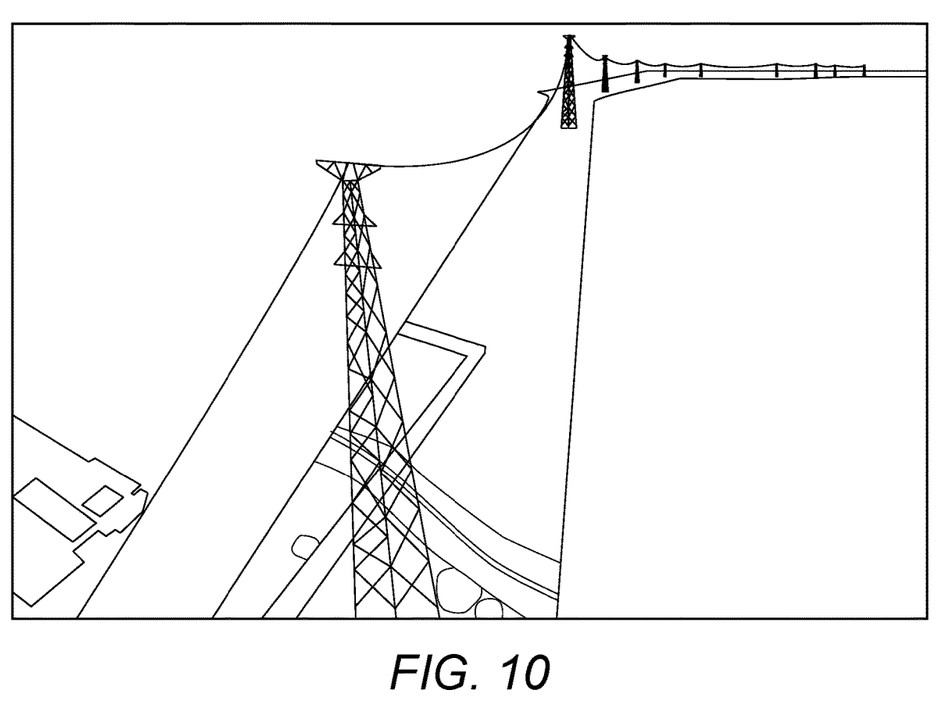
FIG. 10 shows an example of a power transmission line spanning a river.

As an example of the oversailing approach described herein, in the event that a river needs to be crossed by an infrastructure element, then special extra tall towers may be required in order to support an electrical conductor that is strung over the river so as to provide adequate clearance between the catenary of the transmission lines and the highest expected water level for that river. Whilst such utilised towers would be associated with a significant landing parameter, the alternative cost of diverting the line to a point where the river is less wide or to go underneath the river may mean that the best solution is to employ such tall towers. FIG. 10 shows an example of a power transmission line spanning a river and the consequently necessary extra tall support towers.

Granularity

Whilst each polygon in the macro analysis may be comparably large (for example 2 Km across), the polygons used for the micro analysis are relatively small (for example 50 m across). As a consequence of these differing levels of granularity, the weightings of the polygons may be different for the macro analysis when compared to those of the micro analysis. For example, the presence of a motorway or a railway line would be weighted highly in a micro study as it would seldom be prudent to locate an infrastructure element such as a tower within, say, 50 m of a motorway or railway line. This is in contrast to a macro approach where it is much less likely to cause a considerable problem to site an infrastructure element with, say, 2 Km of a motorway of railway line.

As another example, localised mining works or former industrial sites may cause an issue if an infrastructure element is located within, say, 50 metres thereof and so a geotechnical parameter for the micro analysis may be given significant weight in the event that mine or industrial site is in the polygon. In contrast, in the case of a macro polygon, specific details as to the exact location of mining works and industrial sites may be omitted and only a superficial description of, for example geology and surface deposits may be required in order to determine the macro corridor. By only requiring more detailed information when it is really needed (i.e. at the micro level), the need then to expend significant resources in obtaining information for analysis—in terms at least of time, cost, and energy—is reduced.

Neighbours

In addition to the parameters that are associated with each parameter as a consequence of the nature of the region underlying that polygon, as one possibility when determining a route corridor, account may also be taken of neighbouring polygons. Such an approach enables the context (or circumstances of the area surrounding the polygon) to be taken into allowance. As one example, a hexagon polygon may have six parameters (Societal, Vegetation, Environmental, Terrain, Infrastructure, and Geotechnical—SVETIG). The hexagon will also be surrounded by a further six hexagons which would each have their own weighting value and so a choice of routing corridor may be influenced by those surrounding hexagons. As one possibility the total parameter weight for hexagon may be SVEGTIG(a)*100% plus SVEGTIG (b+c+d+e+f+g)*10% where SVEGTIG(a) is a combined value of the polygon of interest's parameters and SVEGTIG(b+c+d+e+f+g) is the sum of each of the combined parameters for each of the surrounding hexagons.

Both the macro and/or the micro approaches may be arranged to take into account neighbouring polygons as described above.

Infrastructure Visibility

As one possibility, a further 'visibility' parameter may be linked to the environmental parameter of each polygon or may be a standalone parameter in itself and may be used to convey a sense of how visible an infrastructure element cited on that polygon would be and how many polygons in the vicinity will be able to see such an infrastructure element. As one possibility the visibility parameter may be defined by the number of polygons from which the infrastructure element can be seen, multiplied by a factor that takes into account the distance from each polygon that can see the infrastructure element to the infrastructure element, optionally further multiplied by a factor that takes into account an assessment of the value of view. An example would be that of a view from an AONB (Area of Outstanding Natural Beauty) a scheduled ancient monument, or a heritage site, the view from which would be valued more highly than a view from an urban or industrial setting. Such an approach would favour the siting of infrastructure elements at low lying areas and away from the skyline. Also, a weighting factor may be applied to determine whether the infrastructure element will be viewed against a backdrop of other terrain, or instead whether it will stand out against the sky. Use of such a parameter enables the visual impact of the infrastructure element to be incorporated into the analysis.

Both the macro and/or the micro approaches may be arranged to take into account visibility as described above.

A 'visual impact' assessment considers a number of factors in order to determine the visibility parameter that would be caused by the construction of an infrastructure element on a given polygon. As one example, each polygon is given a visual amenity weighting with: 'look-out' points, tourist sites, ancient monuments, heritage status locations, national parks, and Areas of Outstanding Natural Beauty (or similar) being given a high numerical weighting (for example 3); standard polygons which are typical of the locality attracting being given a middling weighting (or example 2); and urban or industrial locations (notwithstanding heritage status as identified above) being given a low weighting (for example 1). In such a case, for a polygon that is visible from n other polygons, the visibility parameter is calculated as follows:

visibility parameter=(distance weighting for polygon 1×visual amenity weight for polygon 1)+(distance weighting for polygon 2×visual amenity weighting for polygon 2)+(distance weighting for polygon n×visual amenity weighting for polygon n).

Where exemplary distance weightings are: 0-2 km=3; 2-5 km=2; 5-10 km=1; and >10 km=0.

A visual impact assessment may be considered at both the Micro and the Macro stage, but the availability of data would mean that this consideration would be most likely to be included in the study to 'narrow down' the whole Macro Corridor study area into the Micro Corridor study area.

LiDAR Final Route Definition

Figure 11:
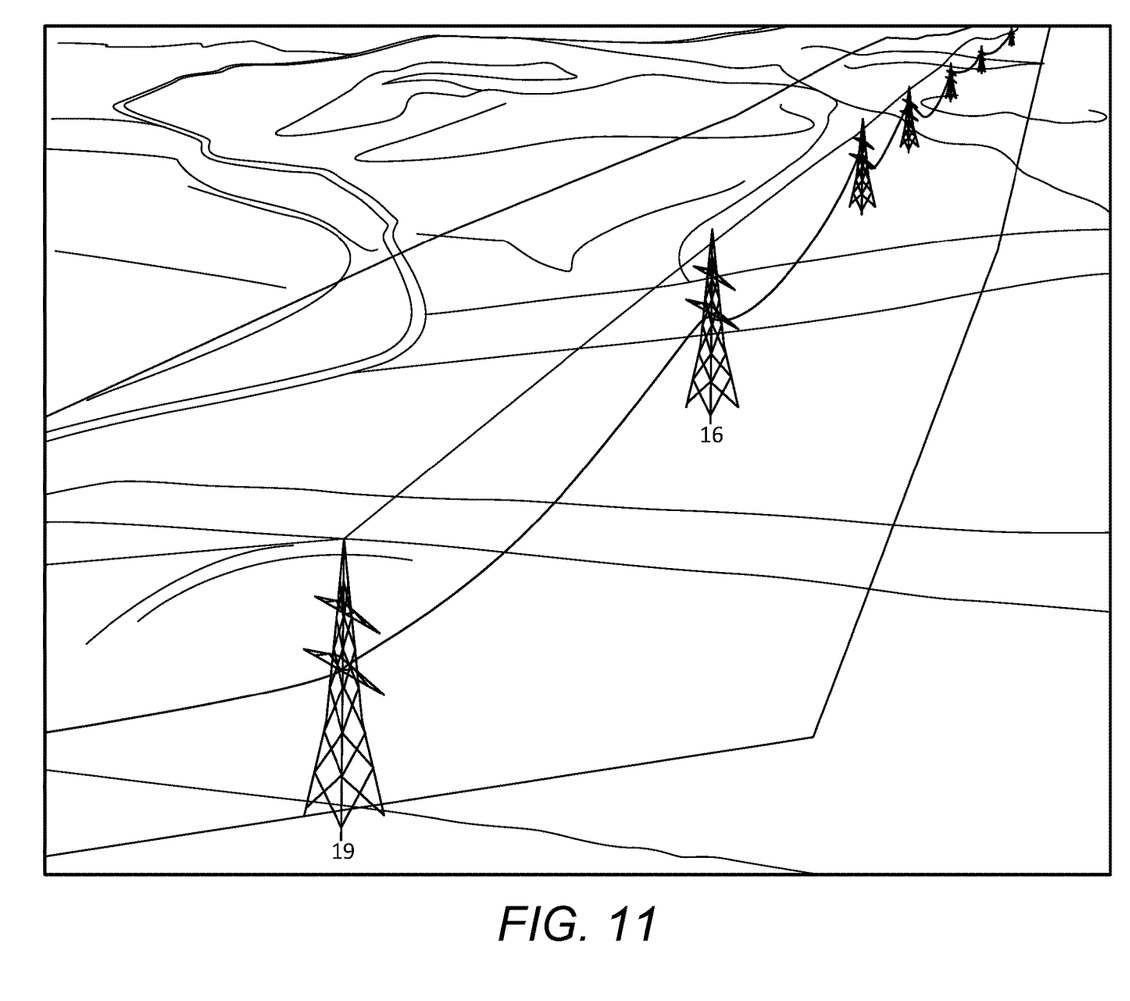
FIG. 11 shows an example micro route corridor for which liDAR imaging has been performed.

Once a micro route corridor has been identified, a swathe of ground including the micro route corridor is overflown by a vehicle, such as the helicopter 510 and that swathe of ground is liDAR imaged. In particular, one or more parameters may be included to define an acceptable 'conductor clearance envelope' or 'how high the conductor must be maintained above the ground and other obstacles' and there parameters may accordingly be incorporated into the optimisation approach in order to determine designed height of infrastructure support towers. Once the parameters have been determined, an optimisation approach, such as that described above in relation to the macro- and micro analyses is carried out in order to determine an optimal final siting for the infrastructure element. FIG. 11 shows an example micro route corridor for which liDAR imaging has been performed and a final route for the infrastructure has been determined. Once the final siting has been determined, the infrastructure element can be constructed and commissioned.

As one example, data captured via LiDAR includes both point clouds and imagery. The density of the point cloud captured may be 20-40 ppm while image resolution may be 2-6 inches. In siting infrastructure such as new transmission lines, the point cloud captured is subsequently processed and classified while the imagery is also ortho-rectified. Feature codes which are numerical in nature are assigned to a specific dataset in the classified point cloud e.g. 100—ground, 102—rail, 103—river, 104—buildings, 105—existing towers. The feature coded data and imagery are then imported into a route determination package such as PLS-CADD which is commercially produced by Power Line Systems Inc. of Madison Wis. USA. The route determination package is then used to perform an optimization routine which tries each potential tower type in each potential tower location and identifies the least cost approach to maintain the conductor above the required clearance envelope. In summary this stage involves data capture, data processing, compiling a database for towers to be used with regards to types, strength and costs and then optimization.

Multiple Start/End Locations

As one possibility, once an optimal route corridor between the first and second locations has been determined at the macro level, a micro level analysis may be employed which that looks at the possibility of deviating from the first and/or second locations in order to expand the range over which the micro analysis is performed. In situations where there are abrupt features that significantly alter parameters, a small shift in the first and/or second location can result in a significantly better optimisation. For example, if a first location is on one side of a motorway and the determined macro route corridor is such that the motorway must immediately be traversed, then shifting the first location a small distance to the other side of the motorway may result in a substantially lower overall route cost. In such cases, movement of the first and/or second locations may be achieved, for example, by relocating a substation or generator, and/or by burying a transmission line underground.

As one example, in the event that polygons having a one kilometre diameter were employed at the macro stage then, once an optimal macro route corridor has been determined, a set of polygons having a smaller (say 50 m diameter) size than that of the macro analysis polygons are defined to not only cover the first polygon of the macro analysis but also to cover one or more of the macro analysis polygons that are adjacent thereto. Each of this first set of small polygons can then be used an alternative first location. Such an approach can also be used for the second location so as to provide a second set of possible small polygons that could serve as the second location. Once each of the first and second sets of small polygons have been defined, optimisations can be performed between the polygons of the first and second sets in order to determine the least cost (in terms of parameters) paths therebetween. As one possibility, a brute force analysis may be performed by optimising all permutations of routes between the polygons of the first and second sets and then assessing which of the routes has the lowest cost (in terms of parameters) path. Alternatively, a search strategy may be employed—for example by performing route optimisation based upon different subsets of the polygons of the first and/or second set and, depending upon the results, selecting other polygons, for example using a gradient descent approach, from the first and/or second set in order to locate a lowest cost (in terms of parameters) path between the first and second sets.

A person skilled in the art will appreciate that, instead of using a helicopter, any suitable aviation platform, for example a fixed wing aeroplane may be employed to gather LiDar data and so mentions herein of the term 'helicopter' could be replaced by the term 'aviation platform' or 'aeroplane'. The approaches described herein may be embodied on a computer readable medium, which may be a non-transitory computer readable medium. The computer readable medium carrying computer readable instructions arranged for execution upon a processor so as to make the processor carry out any or all of the methods described herein.

The term "computer readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Whilst the above has been described with reference to a three-stage approach using first a macro satellite analysis, before a micro satellite analysis and finally a liDAR analysis, the macro satellite analysis or the liDAR analysis could be omitted.

The invention claimed is:

1. A computer implemented method of determining a route for an infrastructure element, the method comprising:
    receiving a first location as a start location and a second location as an end location of the infrastructure element, wherein the infrastructure element, once designed and constructed, will form at least part of a transmission line, a road, or a railway;
    receiving first satellite imaging data of a first satellite imaged region that includes the first location and the second location;
    dividing at least a portion of the first satellite imaged region into first sub-regions, each of the first sub-regions being adjacent to at least another one of the first sub-regions, wherein the first location is within a first one of the first sub-regions and the second location is within a second one of the first sub-regions;
    analysing the received first satellite imaging data to determine one or more first satellite image parameters for each of the first sub-regions of the first satellite imaged region, wherein the one or more first satellite image parameters are determined based on at least one of:
        presence of a hill or body of water;
        presence of a transmission line, road, railway, or waterway;
        presence of buildings; or
        presence of vegetation;
    determining a first route corridor between the first location and the second location based upon the determined one or more first satellite image parameters of each of the first sub-regions;
    receiving second satellite imaging data of a second satellite imaged region that includes the first route corridor, the second satellite imaging data being of higher resolution than the first satellite imaging data;
    dividing at least a portion of the second satellite imaged region into second sub-regions, wherein each of the second sub-regions covers a smaller area than each of the first sub-regions;
    analysing the received second satellite imaging data to determine one or more second parameters for each of the second sub-regions of the second satellite imaged region, wherein the one or more second parameters are determined based on at least one of:
        societal factors;
        type of vegetation;
        environmental factors;
        type of terrain;
        existing infrastructure; and
        geotechnical properties;
    determining a second route corridor between the first location and the second location based upon the one or more second parameters of the second sub-regions;
    receiving aerial liDAR imaging data of a liDAR imaged region that includes the determined second route corridor;
    determining one or more liDAR parameters based on the aerial liDAR imaging data, wherein determining the one or more liDAR parameters includes assigning feature codes to point cloud data; and
    determining the route for the infrastructure element between the first location and the second location based upon the determined liDAR parameters.

2. The method of claim 1, further comprising determining, for each of the second sub-regions of the second satellite imaged region, one or more oversailing parameters associated with the infrastructure element oversailing that second sub-region, and wherein determining the second route corridor between the first location and the second location comprises determining the second route corridor based upon the one or more oversailing parameters.

3. The method of claim 1, wherein determining a first route corridor between the first location and the second location comprises determining a single overall parameter for each of the first sub-regions, the single overall parameter comprising a weighted sum of the one or more first satellite image parameter values associated with that first sub-region and the first satellite image parameter values associated with neighbouring ones of the first sub-regions, and wherein determining the first route corridor between the first location and the second location comprises determining the first route corridor based upon the single overall parameter of each of the first sub-regions.

4. The method of claim 1, further comprising flying over the determined second route corridor to determine the liDAR imaging data.

5. The method of claim 1, wherein, for at least one of the second sub-regions, the determined second parameter is different from the determined first satellite image parameter of a first sub-region that includes the second sub-region.

6. The method of claim 1, wherein the infrastructure element is an electrical transmission line.

7. A nontransitory computer readable medium comprising machine readable instructions arranged, when executed by a processor, to cause the processor to carry out the method of claim 1.

8. A system for determining a route for an infrastructure element, the system comprising a processor configured to:
    receive a first location as a start location and a second location as an end location of the infrastructure element;
    receive first satellite imaging data of a first satellite imaged region that includes the first location and the second location;
    divide at least a portion of the first satellite imaged region into first sub-regions, each of the first sub-regions being adjacent to at least another one of the first sub-regions, wherein the first location is within a first one of the first sub-regions and the second location is within a second one of the first sub-regions;

analyse the received first satellite imaging data to determine one or more first satellite image parameters for each of the first sub-regions of the first satellite imaged region, wherein the one or more first satellite image parameters are determined based on at least one of:
presence of a hill or body of water;
presence of a transmission line, road, railway, or waterway;
presence of buildings; or
presence of vegetation;

determine a first route corridor between the first location and the second location based upon the determined one or more first satellite image parameters of each of the first sub-regions;

receive second satellite imaging data of a second satellite imaged region that includes the first route corridor, the second satellite imaging data being of higher resolution than the first satellite imaging data;

divide at least a portion of the second satellite imaged region into second sub-regions, wherein each of the second sub-regions covers a smaller area than each of the first sub-regions;

analyse the received second satellite imaging data to determine one or more second parameters for each of the second sub-regions of the second satellite imaged region, wherein the one or more second parameters are determined based on at least one of:
societal factors;
type of vegetation;
environmental factors;
type of terrain;
existing infrastructure; and
geotechnical properties;

determine a second route corridor between the first location and the second location based upon the one or more second parameters of the second sub-regions;

receive aerial liDAR imaging data of a liDAR imaged region that includes the determined second route corridor;

determine one or more liDAR parameters based on the aerial liDAR imaging data, wherein determining the one or more liDAR parameters includes assigning feature codes to point cloud data; and determine the route for the infrastructure element between the first location and the second location based upon the determined liDAR parameters.

9. The system of claim 8, wherein the processor is configured to:
determine, for each of the second sub-regions of the second satellite imaged region, one or more oversailing parameters associated with the infrastructure element oversailing that second sub-region; and
determine the second route corridor between the first location and the second location by determining the second route corridor based upon the one or more oversailing parameters.

10. The system of claim 8, wherein the processor is configured to:
determine the first route corridor between the first location and the second location by determining a single overall parameter for each of the first sub-regions, the single overall parameter comprising a weighted sum of the one or more first satellite image parameter values associated with that first sub-region and the parameter values associated with neighbouring ones of the first sub-regions; and
determine the first route corridor between the first location and the second location by determining the first route corridor based upon the single overall parameter of each of the first sub-regions.

11. The system of claim 8, wherein, for at least one of the second sub-regions, the determined second parameter is different from the determined first satellite image parameter of a first sub-region that includes the second sub-region.

12. The system of claim 8, wherein the infrastructure element is an electrical transmission line.

* * * * *